(12) United States Patent
Quinesser

(10) Patent No.: US 8,616,482 B2
(45) Date of Patent: Dec. 31, 2013

(54) KITCHEN APPLIANCE

(75) Inventor: Albert Quinesser, Klagenfurt (AT)

(73) Assignee: Koninklijke Philips N.V., Eindhoven (NL)

( * ) Notice: Subject to any disclaimer, the term of this patent is extended or adjusted under 35 U.S.C. 154(b) by 458 days.

(21) Appl. No.: 12/993,266

(22) PCT Filed: May 20, 2009

(86) PCT No.: PCT/IB2009/052119
§ 371 (c)(1),
(2), (4) Date: Nov. 18, 2010

(87) PCT Pub. No.: WO2009/144637
PCT Pub. Date: Dec. 3, 2009

(65) Prior Publication Data
US 2011/0068204 A1    Mar. 24, 2011

(30) Foreign Application Priority Data

May 30, 2008 (EP) ..................................... 08157301

(51) Int. Cl.
*A47J 43/046* (2006.01)
(52) U.S. Cl.
USPC ....................................................... 241/282.2

(58) Field of Classification Search
USPC .............. 241/282.1, 282.2, 199.12; 366/205, 366/341, 251
See application file for complete search history.

(56) References Cited

U.S. PATENT DOCUMENTS

| | | |
|---|---|---|
| 3,542,178 A | 11/1970 | Ripple |
| 5,908,242 A | 6/1999 | St. John et al. |
| 5,964,690 A | 10/1999 | Wright et al. |
| 6,350,053 B1 | 2/2002 | Morin |
| 6,513,967 B2 | 2/2003 | Masip et al. |
| 6,758,592 B2 | 7/2004 | Wulf et al. |
| 2002/0141285 A1 | 10/2002 | Williams et al. |
| 2007/0144358 A1 | 6/2007 | Huang |

*Primary Examiner* — Mark Rosenbaum (57) ABSTRACT

A kitchen appliance comprising a base station (2) having a support surface (6) on an upper portion thereof and a rotatable drive shaft comprising a first coupling part (7) at a free end thereof. The appliance comprises a removable bowl (3) comprising a bottom part that is supported by the support surface (6) during operation and a coupling member (14) supported from said bottom part. The member comprises a second coupling part (15) for coupling with the first coupling part (7). The first coupling part (7) comprises a head (8) with an outer surface (19) with a number of first cam portions (20). The second coupling part (15) comprises a socket (16) for accommodating the head (8), the socket has an inner circumferential surface (23) with a number of second cam portions (24), said first and second cam portions (20, 24) comprise first respectively second cam faces (21, 25), which mate upon accommodation of the head (8) in the socket (16).

20 Claims, 5 Drawing Sheets

KITCHEN APPLIANCE

FIELD OF THE INVENTION

The present invention relates to a kitchen appliance and to a tool for use with a kitchen appliance according to the present invention.

BACKGROUND OF THE INVENTION

Kitchen appliances such as food processors or stand mixers are well known in the prior art and are used in food preparation in general. In particular in professional food preparation environments ease of use and ease of workflow when using such kitchen appliances is required. In the case of kitchen appliances or food processors that comprise a removable bowl, ease of fixation of the bowl to a base station of the kitchen appliance is beneficial if the fixation itself does not require additional manual movement.

Apart from the above, easy and secure fixation of tools used in such kitchen appliances is also paramount. From a hygienic point of view it is important that kitchen appliances and the parts thereof, such as bowls and tools, can be easily cleaned.

U.S. Pat. No. 5,908,242 A discloses a stand mixer having a locking connection between the mixing bowl and the bowl support or base station. The stand mixer comprises a lower housing with a support that is rotatably mounted thereto and a mixing bowl that is removably connected to the support. Between the mixing bowl and the support is a self-locking connection. The self-locking connection comprises the support having an aperture and the mixing bowl having a member fixedly connected to the mixing bowl. The member fixedly connected to the mixing bowl is adapted to be inserted into the aperture of the support. The member has an engagement surface formed therein in the form of an angled slot. The support has a pin that extends across the aperture, which can engage the angled slot. The mixing bowl is placed over the pin such that pin enters the angled slot. Rotation of the support drives the pin upon the engagement surface of the member. This rotates the member in unison with the support and cams down the mixing bowl against the support to lock the mixing bowl to the support.

A drawback of the kitchen appliance of U.S. Pat. No. 5,908,242 A is that the bowl must be carefully placed onto the support, so that the pin is allowed to engage the angled slot or engagement surface of the member. This requires additional manual operations trying to find the correct position of the bowl on the base station. This is particularly true as the pin will have an arbitrary position depending on where the motor of the kitchen appliance stopped.

Yet another drawback of the kitchen appliance know from U.S. Pat. No. 5,908,242 A is the fact that coupling between the bowl and the support is effected by means of a pin that engages the slot provided in the wall of the member. The pin has only a very limited contact area in common with the slot and hence only a very small contact area that can transfer the movement and thus power from the motor to the bowl. Furthermore, the number of parts that make up the locking connection of the known kitchen appliance is relatively large and the connection is complex.

Another kitchen appliance that is known from the prior art is a kitchen appliance that comprises a base station having a support surface. The base station encloses drive means that drivingly engage a drive shaft that extends from the support surface. The drive shaft of the generally known kitchen appliance is relatively long, i.e. the drive shaft has substantially larger dimensions in its longitudinal direction than its cross-sectional dimensions. The known kitchen appliance further comprises a removable bowl that is supported by the support surface and can be attached to the base station, for example by locking means provided on the bowl and base station that engage by rotating the bowl.

The bowl of the known kitchen appliance comprises a through opening in its bottom part through which the relatively long drive shaft protrudes, more in particular the through opening is shaped as a hollow tubular element open at its free end which extends into the interior of the bowl and through which in turn the drive shaft extends. The tubular element extends along a significant part of the height of the bowl. A tool that is to be used with the known kitchen appliance is placed over the tubular element and can be drivingly engages the drive shaft, which in turn extends beyond the free end of the tubular element.

A drawback of the known kitchen appliance is related to the design of the bowl and in particular to the tubular element that forms a through opening through which the drive shaft extends. The through opening for the drive shaft is in fact an opening in the bottom of the bowl, i.e. the bowl has an opening in its bottom part. Furthermore, as the tubular element extends only along a part of the height of the bowl, the bowl cannot be completely filled with foodstuffs. Also, the tubular element is difficult to clean as it is designed as a relatively narrow tube so as to closely enclose the drive shaft protruding through it.

SUMMARY OF THE INVENTION

It is a general object of the present invention to provide a kitchen appliance that overcomes the aforementioned drawbacks of the known kitchen appliances.

More in particular it is an object of the present invention to provide an improved kitchen appliance which comprises a bowl that is easily and securely attachable to a base station, and provides improved cleanability and usability of the different parts comprised in the kitchen appliance.

According to the present invention this goal is achieved by a kitchen appliance comprising a base station having a support surface on an upper portion thereof and enclosing a drive means for driving a rotatable drive shaft, said drive shaft comprising a first coupling part at a free end thereof. The kitchen appliance further comprises a removable bowl comprising a bottom part that is supported by the support surface during operation and a coupling member provided in said bottom part, said coupling member comprising a second coupling part for coupling with the first coupling part during operation. The first coupling part comprises a head with an outer surface on which a number of first cam portions are provided. The second coupling part comprises a socket for interacting with the head, the socket having an inner surface on which a number of second cam portions are provided, said first and second cam portions comprising first respectively second cam faces. The cam faces mate upon interaction of the head with the socket, such that upon rotating the drive shaft the second coupling part rotates in unison with the first coupling part and the bowl is pulled down towards the support surface.

Coupling of the base station and the bowl by means of the cam portions provided on the respective surfaces results in a very close fit between the head and socket. Furthermore, as the cam faces of the cam portions mate when the head and socket are brought together, i.e. interacting such as accommodation of the head in the socket, no need for further manual operations exists to place the bowl onto the base station. In fact, due to the cam portions and the mating cam faces the connection between the head and socket (and consequently the bowl and the base station) is self-finding. This reduces the number of manual operations to be done by a person using the kitchen appliance according to the invention, increasing the ease of use.

Furthermore, provision of the coupling member in the closed bottom part of the bowl provides a bowl that is open towards its upper end only. This makes it possible to fully use the volume of the bowl, or in comparison with the known bowl with the tubular element, to use a smaller bowl having the same useful volume as the known bowl, making the bowl easier to handle. Further, this eliminates the risk of loosing foodstuffs through the bottom of the bowl and at the same time increasing the cleanability of the bowl.

According to an embodiment of the invention, the first and second cam faces extend, at least partly, in a longitudinal direction along the respective surfaces and are, at least partly, angled relative to said longitudinal direction. In particular, the angle of the first and second cam faces relative to the longitudinal direction is such that said angle is self-loosening. This will allow the bowl to be disconnected, i.e. removed, from the base station easily without the need for additional turning of the bowl when the drive means, such as an electrical motor, has stopped driving the drive shaft.

According to a further embodiment of the invention, the head of the first coupling part comprises a bevelled outer edge, and/or the socket of the second coupling part comprises a bevelled inner edge. This will allow a very convenient interaction between head and socket, such as introduction of the head in the socket or placement of the socket over the head, and will further improve the self-finding feature of the connection between the bowl and the base station.

In a further embodiment of the invention, the first and second cam portions are designed as substantially right-angled triangular members the right angle of which abuts the respective inner and outer edges. In particular, the cam faces of the first and second cam portions are flush with the respective edges of the head and socket and have a cam width that increases in a direction away from the respective edges of the head and socket. In this way the self-finding and self-locking features of the connection are further improved.

In a further embodiment of the invention, the coupling member extends through the bottom part of the removable bowl and comprises a third coupling part for carrying a rotatable tool, such as a cutter or the like. This results in a very compact construction, which is very stable during operation.

In a further embodiment of the invention, the third coupling part comprises a head with an outer surface on which a number of third cam portions are provided, said third cam portions being of similar design as the first cam portions, and the rotatable tool comprises a socket for interacting with the head of the third coupling part, the socket having an inner surface on which a number of fourth cam portions is provided, said fourth cam portions being of similar design as the second cam portions, such that upon rotation of the coupling member during operation the third coupling member and the tool rotate in unison and the tool is pulled down onto the third coupling part. In this way, also for the tool to be used with the kitchen appliance a self-finding and self-locking connection having great ease of use is provided. Furthermore, the inside of the bowl can be easily cleaned.

In a further embodiment of the invention, the socket of the rotatable tool is dimensioned such that it is unable to interact with the head of the first coupling part, in particular that the socket of the rotatable tool has different cross-sectional dimensions than the head of the first coupling part. In this manner the tool cannot be coupled with the head of said first coupling part. This improves safety of the kitchen appliance.

In yet another embodiment of the invention, the first and second cam portions are shaped as elongated ribs that extend helically over at least part of the outer respectively the outer surface of the head of the first coupling part respectively over the inner surface of the socket of the second coupling part.

In a further aspect of the invention a kitchen appliance is provided comprising a base station having a support surface on an upper portion thereof and enclosing a drive means for driving a rotatable drive shaft, said drive shaft comprising a first coupling part at a free end thereof. The kitchen appliance further comprises a removable bowl comprising a closed bottom part that is supported by the support surface during operation and a coupling member provided in said bottom part, said coupling member comprising a second coupling part for coupling with the first coupling part during operation. The first coupling part engages the second coupling part, and the coupling member extends through the bottom part of the removable bowl (3). The coupling member comprises a third coupling part for carrying a rotatable tool, such that upon rotating the drive shaft the second coupling part and the third coupling part rotate in unison with the first coupling part.

In this manner the rotatable tool that is housed in the interior of the bowl is no longer directly driven by the drive shaft of the kitchen appliance, but is only coupled and driven by the coupling member of the bowl. Again, provision of the coupling member in the closed bottom part of the bowl provides a bowl that is open towards its upper end only. This makes it possible to fully use the volume of the bowl, or in comparison with the known bowl with the tubular element, to use a smaller bowl having the same useful volume as the known bowl, making the bowl easier to handle. Further, this eliminates the risk of loosing foodstuffs through the bottom of the bowl and at the same time increasing the cleanability of the bowl.

In a further embodiment of the invention the tool comprises a socket for interacting with a head provided on the third coupling part, the socket having an inner surface on which a number of angled cam portions is provided that can mate with a number of angled cam portions provided on said head, such that upon rotation of the drive shaft the third coupling member and the tool rotate in unison and the tool is pulled down onto the third coupling part.

Coupling of the tool by the coupling member of the bowl by means of the cam portions results in a very close fit between the head and socket. Furthermore, no need for further manual operations exists to place the tool in the bowl. In fact, due to the cam portions the connection between the head and socket (and consequently the bowl and the tool) is self-finding. This reduces the number of manual operations to be done by a person using the kitchen appliance according to the invention, increasing the ease of use. Furthermore, because the tool is pulled onto the coupling member a very secure coupling is achieved.

BRIEF DESCRIPTION OF THE DRAWINGS

Further aspects and advantages of the present invention will be discussed in more detail in the following description, taken in connection with the accompanying drawings, and in which.

DETAILED DESCRIPTION OF THE EMBODIMENTS

Figure 1:
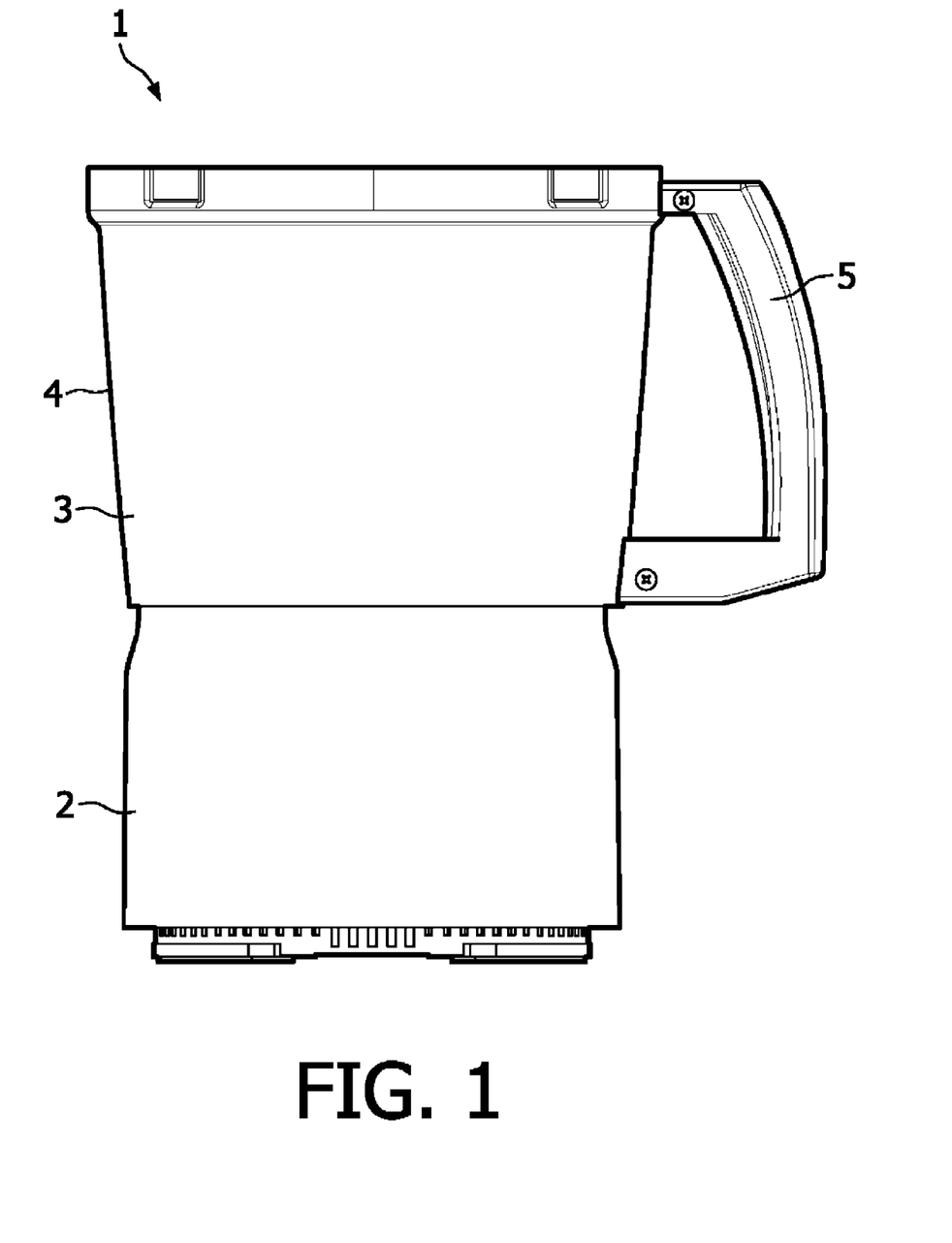
FIG. 1 is a side view of a kitchen appliance according to the invention.

Referring to FIG. 1, there is shown a kitchen appliance, generally denoted by reference numeral 1. The kitchen appliance 1 is for example a food processor for preparing food stuffs, or is a mixer. The kitchen appliance 1 as shown in FIG. 1 comprises a base station 2, which encloses a drive means for driving a rotatable drive shaft (see FIG. 2). The drive means is for example an electric motor connected to the mains, or which takes its energy from a rechargeable battery for example. The base station 2 may further comprise control means, such as control switches etcetera. These are not shown.

The kitchen appliance 1 further comprises a removable bowl 3, which has a bowl wall 4 and a bottom part 11 (see FIG. 3) and can hold food stuffs. The bowl further comprises a handle 5 so a person can handle the bowl, in particular can place the bowl 3 on the base station 2 and/or remove the bowl 3 from the base station 2.

Figure 2:
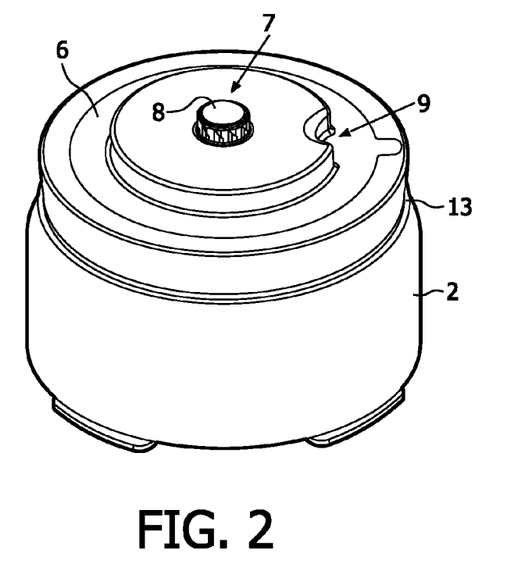
FIG. 2 is a perspective view of a base station of the kitchen appliance of FIG. 1.

FIG. 2 shows the base station 3 in a perspective view. The base station 2 has a support surface 6 on an upper portion thereof. The drive means (not shown) inside the base station 2 are coupled to and arranged for driving a rotatable drive shaft (not shown), which drive shaft comprising a first coupling part 7 at a free end thereof. The first coupling part 7, which will be described in more detail with reference to FIGS. 4A and 4B, further comprises a head 8.

The support surface 6 of the base station 2 is provided with a rotation lock in the form of a cut-away 9, which is provided to prevent the bowl 3 from rotating during operation by accommodating a notch 10 (see FIG. 3) which is provided in the bottom part of the bowl 3.

Figure 3:
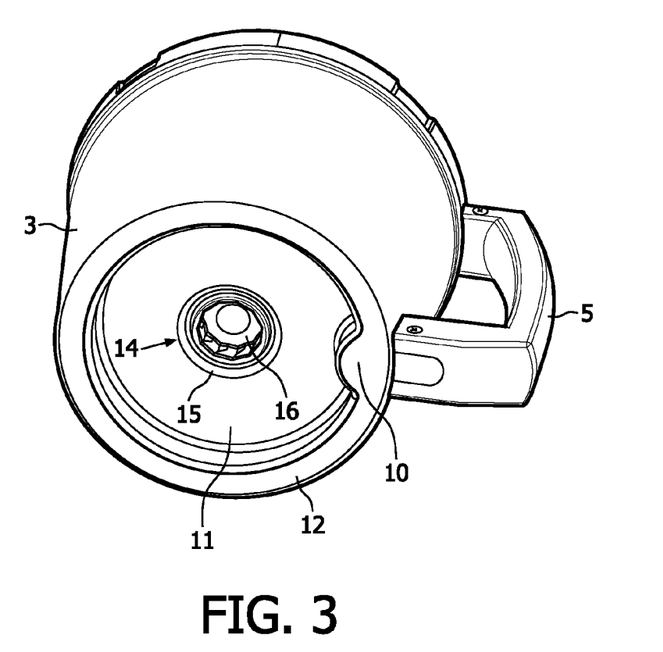
FIG. 3 is a bottom perspective view of a bowl of the kitchen appliance of FIG. 1.

FIG. 3 shows in a perspective view the bowl 3 from the bottom part 11 upwards. The bottom part 11 is supported by the support surface 6 of the base station 2 during operation of the kitchen appliance. For reasons of stability, the bowl 3 is mounted onto the base station 2 as can be seen in FIG. 1, The bottom part 11 of the bowl 3 and the support surface 6 of the base station 2 have complementary designs. In particular, the support surface 6 of the base station 2 fits, at least partly, inside the bottom part 11 of the bowl 3, whereby a bottom edge 12 of the bowl supports on and against a corresponding support edge 13 (see FIG. 2) of the base station 2. Thus removing the support surface 6 from view when the bowl 3 is placed on the base station 2.

A coupling member 14 is provided in the bottom part 11. The coupling member 14 comprises a second coupling part 15 for coupling with the first coupling 7 part during operation of the kitchen appliance 1. The second coupling part 15 comprises a socket 16 which is designed to accommodate the head 8 of the first coupling part 7. The second coupling part 15 will be described in more detail with reference to FIGS. 5 and 6.

As can further be seen in FIG. 3, the bottom part 11, or in the present embodiment the bottom edge 12 thereof, is provided with the notch 10 that together with the cut-away 9 (see FIG. 2) prevents the bowl 3 from rotating during operation. In FIG. 3 the notch 10 is part of the bottom part 11 of the bowl 3, however it is also possible that the notch 10 is made part of the lower end of the handle 5.

Figure 4A:
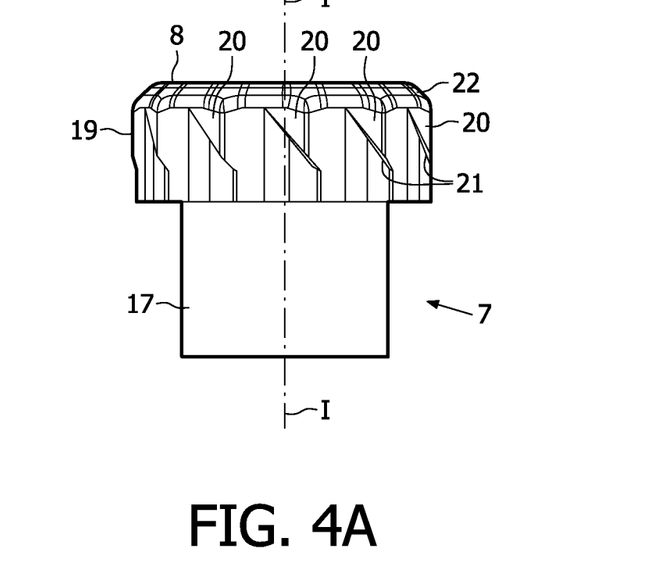
FIG. 4A is a side elevation view of a first coupling part.
Figure 4B:
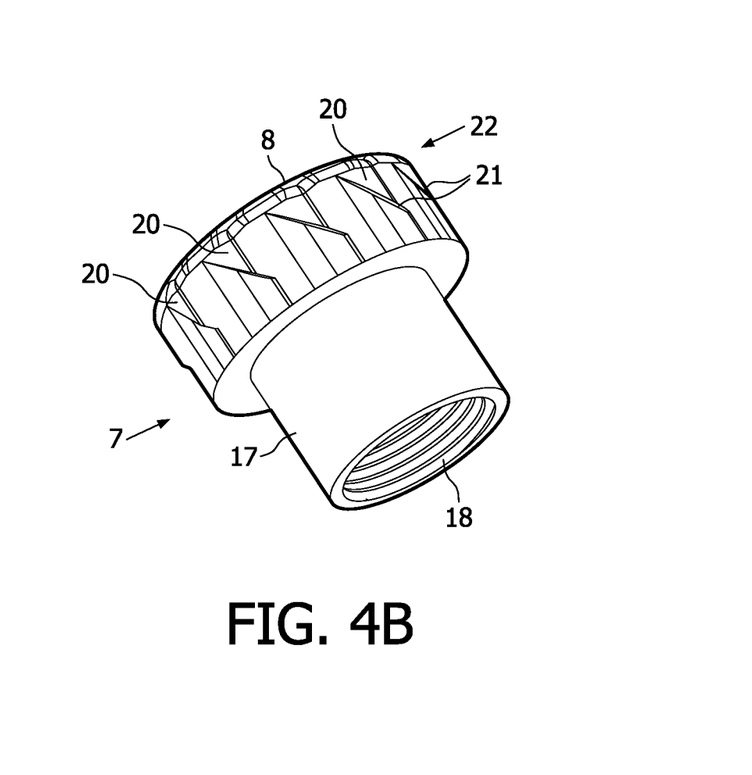
FIG. 4B is a bottom perspective view of the first coupling part of FIG. 4A.

FIGS. 4A and 4B show the first coupling part 7 of the base station 2 of FIG. 2 in more detail. The first coupling part 7 comprises the head 8 and a stem 17 which is designed as a tubular part provided with an inner thread 18 for coupling to the drive shaft (not shown). It is noted that the stem 17 is not an essential feature of the first coupling part 7. However, from a viewpoint of cleanability the provision of a stem is beneficial. The head 8 comprises an outer circumferential surface 19 on which a number of first cam portions 20 are provided. The cam portions 20 are in turn provided with first cam faces 21.

The first cam faces 21, at least partly, extend in longitudinal direction I-I (which longitudinal direction coincides with the axis of rotation of the first coupling part 7 and consequently with the axis of rotation of the drive shaft of the kitchen appliance) along the outer circumferential surface 19 and are, at least partly, angled relative to said longitudinal direction I-I. Preferably, the angle of the first cam faces 21 relative to the longitudinal direction I-I is such that said angle is self-loosening. This means that, as will be explained in more detail with reference to FIGS. 3 and 5, the bowl 3 will be easily removable from the base station 2. As can be seen in FIGS. 4A and 4B, the first cam portions 20 are evenly distributed over the outer circumference 19 of the first coupling part 7, but the invention is not limited thereto. Any arbitrary distribution is possible as long as the socket 16 is capable of interacting (accommodating) with the head 8.

In the embodiment of FIG. 2 and FIGS. 4A and 4B the head 8 is of a substantially circular cross-sectional design. The invention is however not limited to such a design. It is also possible to provide the head 8 with any suitable design, as long as the head 8 has an outer surface on which it is possible to provide the cam portions 20 and such that the head can interact with the socket 16. An example of such a different design is a head which has two or more elongate arms that extend perpendicularly to the direction of rotation of the head and on the free ends thereof comprise the cam portions. It will be understood that in this example the number of first cam portions may not be the same as the number of second cam portions. In fact, the number of second cam portions may even be greater to guarantee proper interaction of said cam portions. Another example would be that the head 8 has an substantially asterisk-like cross-section in which the outer surfaces are located on the free ends of the arms of the asterisk. The socket 16 may in these cases have a cross-sectional shape that is adapted to the cross-sectional shape of the head 8. These examples are not shown in the drawing, but the person skilled in the art will understand how to achieve this.

The head 8 of FIGS. 2, 4A and 4B has a cross-sectional dimension that is larger than the cross-sectional dimension of the stem 17. In particular, the cross-sectional dimension of the head 8 is dimensioned such that it overlaps a bore (not shown) through which the stem 17 extends and couples with the drive shaft. In this manner the bore which is in principle an opening into the base station can be effectively closed and dirt is prevented to enter the base station. With reference to FIG. 2 it can be seen, that the support surface 6 and the first coupling part 7 only comprise outwardly directed surfaces, which are easily cleaned.

Furthermore, as can be seen from FIGS. 2, 4A and 4B the outer surface 19 of the head 8 is very smooth, which is beneficial for the cleanability thereof.

FIGS. 4A and 4B further show that the first coupling part 7, or the head 8, comprises a bevelled outer, in the embodiment shown a circumferential, edge 22. As will be discussed in more detail with reference to FIGS. 3 and 5, this allows a very convenient mounting of the bowl 3 on the base station 2, as the head 8 of the first coupling part 7 will easily be inserted in the socket 16 of the coupling member 14. Further improvement of the insertion (interaction) of the head 8 into the socket 16 can be achieved by designing the first cam portions 20 as substantially right-angled triangular members the right angle of which abuts the outer circumferential edge 22, whereby the first cam faces 21 of the first cam portions 20 are preferably flush with the outer circumferential edge 22 of the head 8 and have a cam width that increases in a direction away from the outer circumferential edge 22 of the head 8. It is noted that it is also possible for the cam faces 21 to have for example a constant width over their length, or any other variant. The embodiment shown however is particularly beneficial. It is further noted that in the example shown, the cam faces 21 are continuous, but that it is also possible to provide cam surfaces that are not continuous. For example, the cam portions may be formed by a number of separate smaller elements having separate cam surfaces.

Figure 5:
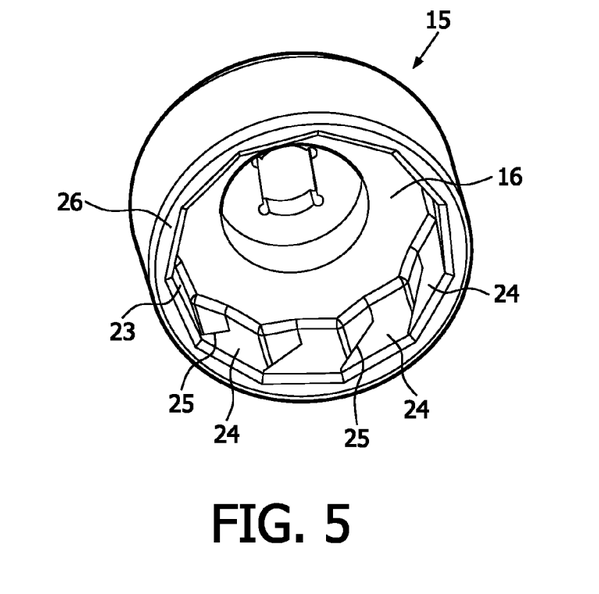
FIG. 5 is a bottom perspective view of a second coupling part.

FIG. 3 and in more detail FIG. 5 show the second coupling part 15 that is part of the coupling member 14 (see FIG. 3). The second coupling part 15 comprises, as mentioned earlier, the socket 16 which is constructed and arranged to interact with, e.g. accommodate the head 8 of the first coupling part 7. The socket 16 is designed to form a blind hole in the coupling member 14 and has an inner circumferential surface 23 on which a number of second cam portions 24 are provided. The number of second cam portions 24 may correspond to the number of first cam portions 20, but may also be different. Relevant is that the second cam portions 24 and the first cam portions 20 are able to interact. Similar to the first cam portions 20, the second cam portions 24 comprise second cam faces 25. The second cam faces 25 are designed such that when the head 8 of the first coupling part 7 is introduced into the socket 16 of the second coupling part, i.e. when the bowl 3 is attached to the base station 2, the respective cam faces 21, 25 mate.

To achieve this, the second cam faces 25, similarly as the first cam faces 21, extend, at least partly, in longitudinal direction (i.e. along the direction of the axis of rotation as explained with reference to FIG. 4A) along the inner circumferential surface 23 and are, at least partly, angled relative to said longitudinal direction. In fact, the angle of the second cam faces 25 relative to the longitudinal direction is (substantially) the same as the angle of the first cam faces 21 to that longitudinal direction.

FIG. 5 further shows that the socket 16 of the second coupling part 15 comprises a bevelled inner circumferential edge 26, which allows easy introduction of the head 8 of the first coupling part 7.

Similarly to the design of the first cam portions 20 (see FIG. 4A, 4B), the second cam portions 24 are also designed as substantially right-angled triangular members the right angle of which abuts the inner circumferential edge 26. The second cam faces 25 of are flush with the inner circumferential edge 26 of the socket 16 and have a cam width that increases in a direction away from the inner circumferential edge 26 of the socket 16. As explained above, this improves the introduction of the head 8 into the socket 16 by a slight rotation of both coupling parts with respect to each other due to the weight of the bowl. Hence, the self-finding feature of the kitchen appliance according to the invention is improved.

It is noted, that the same remarks made with respect to the first cam portions 20 and in particular to the width of the first cam faces 21 also apply to the second cam portions 24 and the second cam faces 25. Hence, also the inner surface 23 of the socket 16 is smooth.

Another effect of the specific design of the cam portions and the respective cam faces is, that the cam faces 21, 25 mate upon accommodation of the head 8 in the socket 16, such that upon rotating the drive shaft, i.e. turning on the kitchen appliance, the second coupling 15 part rotates in unison with the first coupling 7 part and the bowl 3 is pulled down towards the support surface 2.

As the cam faces 21, 25 mate and the cam faces 21, 25 all, preferably, have a cam width that increases in a direction away from the respective circumferential edges 22, 26, the head 8 and the socket 16 are in very close contact when the bowl 3 is placed on the base station 2. This close fit yields a very stable connection which is self-locking and has excellent running characteristics.

Because of the self-finding and self-locking properties of the coupling between the bowl 3 and the base station 2, a user who wants to place the bowl onto the base station only needs to place the bowl in such a manner on the base station that the notch 10 (see FIG. 3) engages the cut-away 9 (see FIG. 2). Hence, no attention needs to be given to any further positioning of the bowl on the base station.

As mentioned above, the kitchen appliance according to the present invention is for example a food processor. Such a kitchen appliance may comprise a rotatable tool that works on food stuffs that are present inside the bowl. In order for such a tool to be rotatable, the present invention is further characterized in that the coupling member 14 extends through the bottom part 11 of the removable bowl 3 and comprises a third coupling part 27 for carrying a rotatable tool, such as a cutter or the like. This is shown in FIG. 6 in which the inside or interior of the bowl 3 can be clearly seen.

Figure 6:
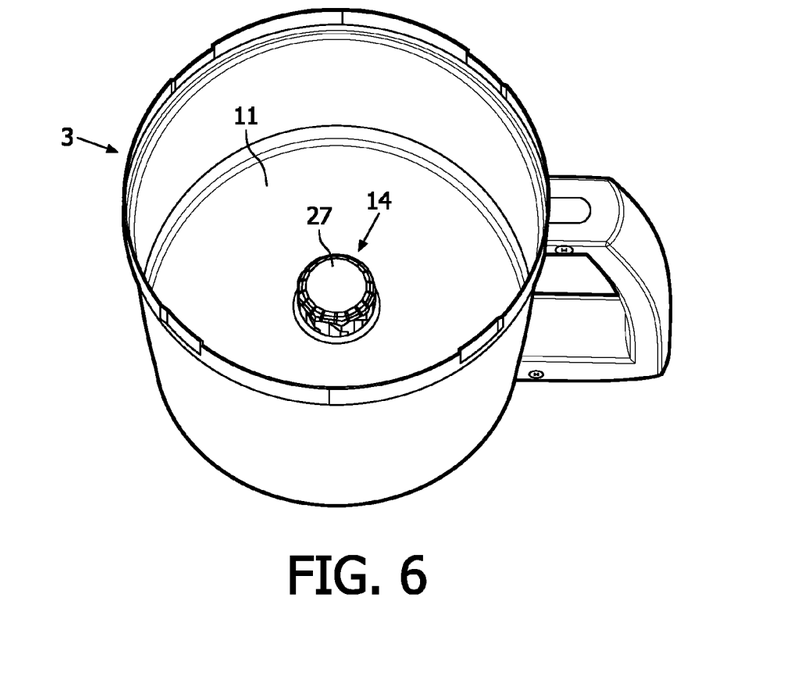
FIG. 6 is a top perspective view of the bowl of the kitchen appliance of FIG. 1.
Figure 7:
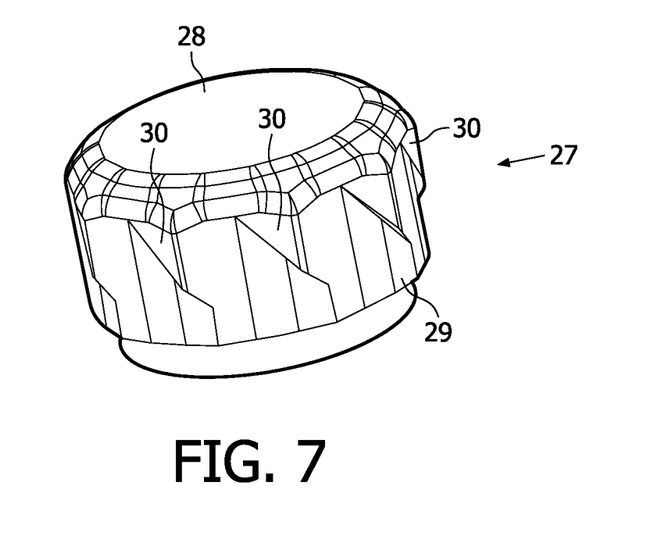
FIG. 7 is a top perspective view of a third coupling part.

It can further be seen in FIG. 6 and also in FIG. 7, that the third coupling part 27 comprises a head 28 with an outer circumferential surface 29 on which a number of third cam portions 30 are provided. The head 28 and the third cam portions 30 have a similar design as the head 8 and the first cam portions 20 thereof. It is noted here that consequently the remarks made with respect to the head 8 of the first coupling part 7 and its cam portions 20 etc. also apply to the head 28 of the third coupling part 17. This also applies to any alternative designs of the third coupling part 27, in particular the head 28 thereof. Hence, for further details of the third coupling part 27 reference is made to the description of the first coupling part 7.

Further it can been seen in FIG. 6, that the bowl 3 and in particular its bottom part 11 is fully closed, i.e. there is no opening in the bottom part 11 through which for example the drive shaft extends, such as known from the prior art. This improves the usability and cleanability of the bowl 3 and therewith of the kitchen appliance. As can further be seen in FIG. 6, the dimensions of the third coupling part 27 in an axial direction of the bowl, i.e. along its centre line, are relatively small in comparison with its cross-sectional dimensions.

Figure 8:
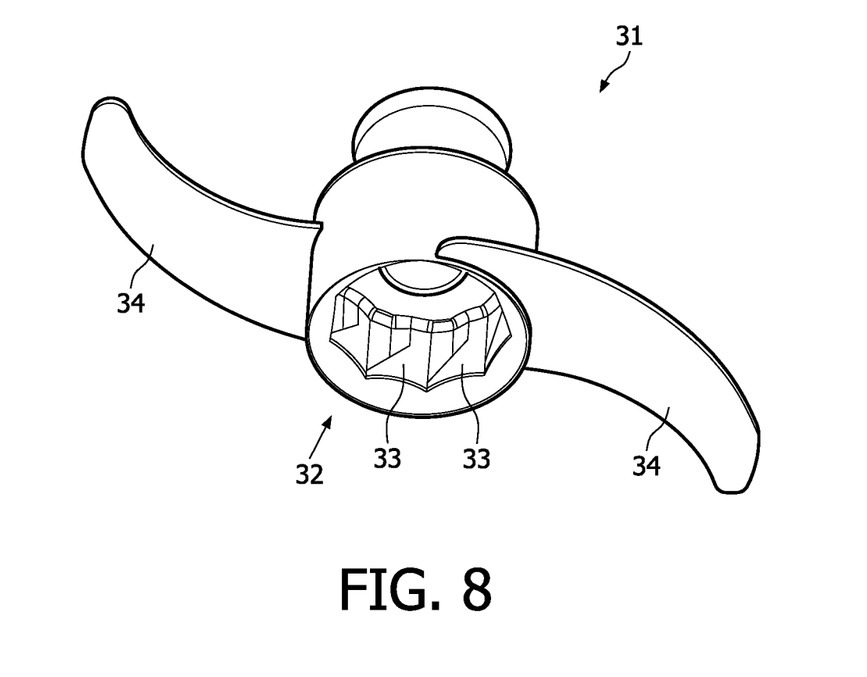
FIG. 8 is a bottom perspective view of a tool suitable for use with the kitchen appliance of FIG. 1.

The rotatable tool is not shown in FIG. 6 for reasons of illustrative simplicity. However, an example of such a tool is given in FIG. 8. FIG. 8 shows schematically in perspective a rotatable tool 31. The tool 31 is for example a knife, comprising two knife blades 34. The tool 31 further comprises a socket 32 for accommodating the head 28 of the third coupling part 27 in a manner that is similar to which the second coupling part 15 couples with the first coupling part 7. Hence, reference is made here to the description thereof for a full explanation and for possible alternative designs. Similarly to the design of the second coupling part 15, the third coupling part 27, in particular the socket 32 has an inner circumferential surface on which a number of fourth cam portions 33 is provided. The fourth cam portions 33, as mentioned, are of similar design as the second cam portions 24, such that upon rotation of the coupling member 14 during operation the third coupling member 30 and the tool 31 rotate in unison and the tool 31 is pulled down onto the third coupling part 27.

Again, the socket 32 of the tool 31 has a bevelled inner circumferential edge.

As a general remark it is noted that the respective cam portions and cam faces as described above provide the surfaces on which they are provided with a smooth surface. This means that the profile or corrugation that is formed on the respective, circumferential, surfaces is shallow. This results in a close fit between the respective heads and sockets, in turn resulting in good self-finding and self-locking properties. Also, this improves cleanability.

From the above it can be learned that the coupling member indirectly couples the drive shaft i.e. the first coupling part 7 with the tool 31. The coupling member 14 and the associated coupling parts 7, 15 together form a very compact coupling between the bowl 3 and the base station 2, while at the same time taking care of rotatingly driving and coupling the tool 31. In fact, only the bowl 3, i.e. the coupling member 14, couples the tool 31. Together with edges 12, 13 (see FIGS. 2 and 3) the self-finding and self-locking coupling according to the present invention provides a mechanically stable coupling.

It is noted, that the socket 32 of the rotatable tool 31 is dimensioned such that it is unable to interact with the head 8 of the first coupling part 7. This can either be done by making the cross-sectional dimensions of the socket 32 larger that the cross-sectional dimensions of the head 8, or smaller. In both cases this will mean that the cam portions 33 of the tool 31 cannot mate with the cam portions 20 of the head 8. This greatly improves the safety of the kitchen appliance 1 as it has become impossible to accidently or purposively attach the tool 31, which in the shown example is a knife, to the kitchen appliance without the safe wall 4 of the bowl 3 surrounding it.

It is further noted, that the spirit of the invention also applies to a kitchen appliance in which the bowl 3 is not locked onto the base station 2 by pulling it down thereon, i.e. attachment of the bowl 3 onto the base station 2 may also be accomplished by a conventional locking procedure. This would mean that only the third coupling part 27 and the tool 31 need to be provided with cam portions so as to pull the tool 31 onto the bowl 3 during operation of the kitchen appliance. This would still provide a kitchen appliance with improved cleanability and ease of use compared to prior art appliances, in particular this would still provide a kitchen appliance with a bowl that has a fully closes bottom part carrying a rotatable tool that is driven by a driving means that is located in the base station 2.

It is further noted that in view of the above, the spirit of the invention is also comprised in an assembly of a bowl and a rotatable tool as described in conjunction with the disclosed kitchen appliance.

Although the present invention has been described with respect to the given embodiments, it is to be understood that the scope of protection is not limited to the examples shown. For example, the cam portions shown with reference to the drawings comprise a relatively shallow profile or corrugation of the respective circumferential surfaces. It is also possible to design more pronounced cam portions, for example cam portions that are designed as longitudinal ribs that extend over (at least part) of the respective circumferential surfaces. Such cam portions would be more thread-like in design, but the same inventive principles underlie such a design.

Further, it is to be understood that the field of kitchen appliances embraces more than the example kitchen appliance as discussed in relation to the embodiments shown in the figures. Kitchen appliances in which the invention can also be used are for example, stem mixers, juice extractors, food processors etc.

Furthermore, although the invention has been described in relation to a kitchen appliance, it is to be understood that the inventive concept may also be applied to other fields of technology.

The invention claimed is:

1. A kitchen appliance comprising:
a base station having a support surface on an upper portion thereof and enclosing a drive means for driving a rotatable drive shaft, said drive shaft comprising a first coupling part at a free end thereof, and
a removable bowl comprising an integral bottom part that is supported by the support surface which fits partially inside said bottom part during operation and a coupling member provided in said bottom part, said coupling member comprising a second coupling part for coupling with the first coupling part during operation, and
wherein the first coupling part comprises a head with an outer surface on which a number of first cam portions are provided, the second coupling part comprises a socket for interacting with the head, the socket having an inner surface on which a number of second cam portions are provided, said first and second cam portions comprising respective first and second cam faces, said cam faces mating upon interaction of the head with the socket, such that upon rotating the drive shaft the second coupling part rotates in unison with the first coupling part and the bowl is pulled down towards the support surface.

2. The kitchen appliance of claim 1, wherein the first and second cam faces, at least partly, extend in a longitudinal direction along the respective surfaces and are, at least partly, angled relative to said longitudinal direction.

3. The kitchen appliance of claim 2, wherein the angle of the first and second cam faces relative to the longitudinal direction is such that said angle is self-loosening.

4. The kitchen appliance of claim 1, wherein, the head of the first coupling part comprises a bevelled outer edge adjacent the outer surface, and/or the socket of the second coupling part comprises a bevelled inner edge adjacent the inner surface.

5. The kitchen appliance of claim 4, wherein the first and second cam portions are designed as substantially right-angled triangular members the right angle of which abuts the respective inner and outer edges.

6. The kitchen appliance of claim 4, wherein the first and second cam faces of the first and second cam portions are flush with the respective edges of the head and socket and have a cam width that increases in a direction away from the respective edges of the head and socket.

7. The kitchen appliance of claim 1, wherein the first and second cam portions are shaped as elongated ribs that extend helically over at least part of the outer surface of the head of the first coupling part, respectively over at least part of the inner surface of the socket of the second coupling part.

8. The kitchen appliance of claim 1, wherein the coupling member extends through the bottom part of the removable bowl and comprises a third coupling part for carrying a rotatable tool.

9. The kitchen appliance of claim 8, wherein the third coupling part comprises a head with an outer surface on which a number of third cam portions are provided, said third cam portions being of similar design as the first cam portions.

10. The kitchen appliance of claim 9, wherein the rotatable tool comprises a socket for interacting with the head of the third coupling part, the socket having an inner surface on which a number of fourth cam portions is provided, said fourth cam portions being of similar design as the second cam portions, such that upon rotation of the coupling member during operation the third coupling member and the tool rotate in unison and the tool is pulled down onto the third coupling part.

11. The kitchen appliance of claim 10, wherein the socket of the tool has a bevelled inner edge.

12. The kitchen appliance of claim 10, wherein the socket of the rotatable tool is dimensioned such that it is unable to interact with the head of the first coupling part, in particular that the socket of the rotatable tool has different cross-sectional dimensions than the head of the first coupling part.

13. The kitchen appliance of claim 1, wherein the support surface of the base station is provided with a rotation lock adapted to prevent the bowl from rotating during operation.

14. A kitchen appliance comprising:
a base station having a support surface on an upper portion thereof and enclosing a drive means for driving a rotatable drive shaft, said drive shaft comprising a first coupling part at a free end thereof, and
a removable bowl comprising an integral closed bottom part that is supported by the support surface during operation, wherein said support surface fits partially inside said bottom part, the removable bowl further comprising a coupling member provided in said bottom part, said coupling member comprising a second coupling part for coupling with the first coupling part during operation, and
wherein the first coupling part engages the second coupling part, and the coupling member extends through the bottom part of the removable bowl and comprises a third coupling part for carrying a rotatable tool, such that upon rotating the drive shaft the second coupling part and the third coupling part rotate in unison with the first coupling part.

15. The kitchen appliance of claim 14, wherein the tool comprises a socket for interacting with a head provided on the third coupling part, the socket having an inner surface on which a number of angled cam portions is provided that can mate with a number of angled cam portions provided on an outer surface of said head, such that upon rotation of the drive shaft the third coupling member and the tool rotate in unison and the tool is pulled down onto the third coupling part.

16. The kitchen appliance of claim 15, wherein said cam portions comprise cam faces that, at least partly, extend in a longitudinal direction long said surfaces and are, at least partly, angled relative to said longitudinal direction.

17. The kitchen appliance of claim 16, wherein the head of the third coupling part comprises a bevelled outer edge adjacent its outer surface, and/or the socket of the tool comprises a bevelled inner edge.

18. The kitchen appliance of claim 17, wherein said cam portions are designed as substantially right-angled triangular members the right angle of which abuts the respective inner and outer edges of the head and the socket.

19. The kitchen appliance of claim 17, wherein said cam portions are shaped as elongated ribs that extend helically over at least part of the outer surface of the head, respectively over at least part of the inner surface of the socket.

20. The kitchen appliance of claim 17, wherein said cam faces of said cam portions are flush with said respective edges of the head and socket and have a cam width that increases in a direction away said respective edges.

* * * * *